Patented May 7, 1929.

1,711,903

UNITED STATES PATENT OFFICE.

THOMAS E. PARROTT, OF CLAREMORE, OKLAHOMA, ASSIGNOR TO ALEMITE MANUFACTURING CORPORATION, OF CHICAGO, ILLINOIS, A CORPORATION OF DELAWARE.

GREASE GUN.

Application filed February 4, 1925. Serial No. 6,739.

This invention relates to new and useful improvements in grease guns, and particularly to that class of grease guns which are adapted for use in supplying grease to the bearings of motor vehicles.

One object of the invention is to provide a grease gun whereby grease can be properly forced into a bearing which has become clogged by the rusting of the ball valve of the nipple of the bearing.

Another object is to provide a device of this character by means of which the bearing nipples or fittings may be reached by the grease gun, from various angles.

Another object is to provide a grease gun of such construction that the initial operating pressure exerted thereon will force the grease to the bearing, and the subsequent pressure exert an additional force whereby to effectively drive the grease into the bearing.

Other objects and advantages will be apparent from the following description when taken in connection with the accompanying drawing.

In the drawing:

Figure 1 is a vertical longitudinal sectional view through a grease gun made in accordance with the present invention, and in initial operating position.

Figure 2 is a horizontal sectional view on the line 2—2 of Figure 1.

Figure 3 is a horizontal sectional view on the line 3—3 of Figure 1.

Figure 4 is a vertical longitudinal sectional view showing the final or forcing position of the parts.

Referring particularly to the accompanying drawing, 10 represents the barrel of the grease gun, which has the screw closure 11 on its upper end. The lower end of the barrel is tapered, as shown at 13, and is slidably telescoped on the tube 14. Within the smaller end of the barrel there is formed a ledge or shoulder 15, on which rests the lower smaller end of the tapered plunger or piston 16. Throughout the length of the tube 14 there is formed the bore 17, the upper end portion of which is of larger diameter than the main portion thereof, as shown at 18, said upper end of the tube being slidably received through the lower end of the piston 16, and into the chamber 19, formed within said piston. The portion of the tube, within the said chamber 19, is formed with a peripheral flange 20 which rests on the shoulder 21, formed in the smaller end of the piston 16, by means of which upward movement of the piston is limited, under the upward force of the spring 25. In the sides of the tube 14, above the flange 20, there are formed the elongated slots 22, which establish communication between the interior of the chamber 19 and the upper portion 18 of the bore. Slidably disposed in the upper end of the bore is a plunger stem 23, the upper end of which is formed with a shouldered head 24. Encircling the said upper portion of the tube 14, and the said stem 23, and bearing at its opposite ends against the flange 20, and a disk head 27, is a coil spring 25, which urges the stem upwardly, to uncover the slots 22. The upper end of the head 24 is reduced in diameter, as shown at 26, and disposed on this portion 26 is a centrally apertured disk 27, the periphery of which bears in close relation to the wall of the barrel 10, and is threaded onto the upper end of the chamber 19. Also secured on this portion 26 is a cup washer 28, and a washer disk 29, the former of which snugly engages with the wall of the barrel. Formed through the washers and the disk 27, are the circular series of openings 30, which provide passages for the grease to flow from the barrel into the chamber 19, as will be explained later herein.

The lower end of the bore 17 is slightly enlarged in diameter, as shown at 31, and seated within this portion of the bore is a ball valve 32, said valve being yieldably held to its seat by the coil spring 33, which engages with the ball, and with a shoulder 34, formed in said portion of the bore, below the seat. Removably engaged on the lower end of the tube 14 is a nipple, or nozzle, 35, and formed longitudinally through this nipple is a passage 36, which alines with the bore 17, for passage of grease into the automobile fitting 37, which fitting is provided with a spring pressed ball valve 38. The lower end of the nipple is formed with a depression 39 and in the center of this de- May 7, 1929.  H. A. PALMER  1,711,904
CYLINDER FOR INTERNAL COMBUSTION ENGINES
Filed April 11, 1927   2 Sheets-Sheet 2
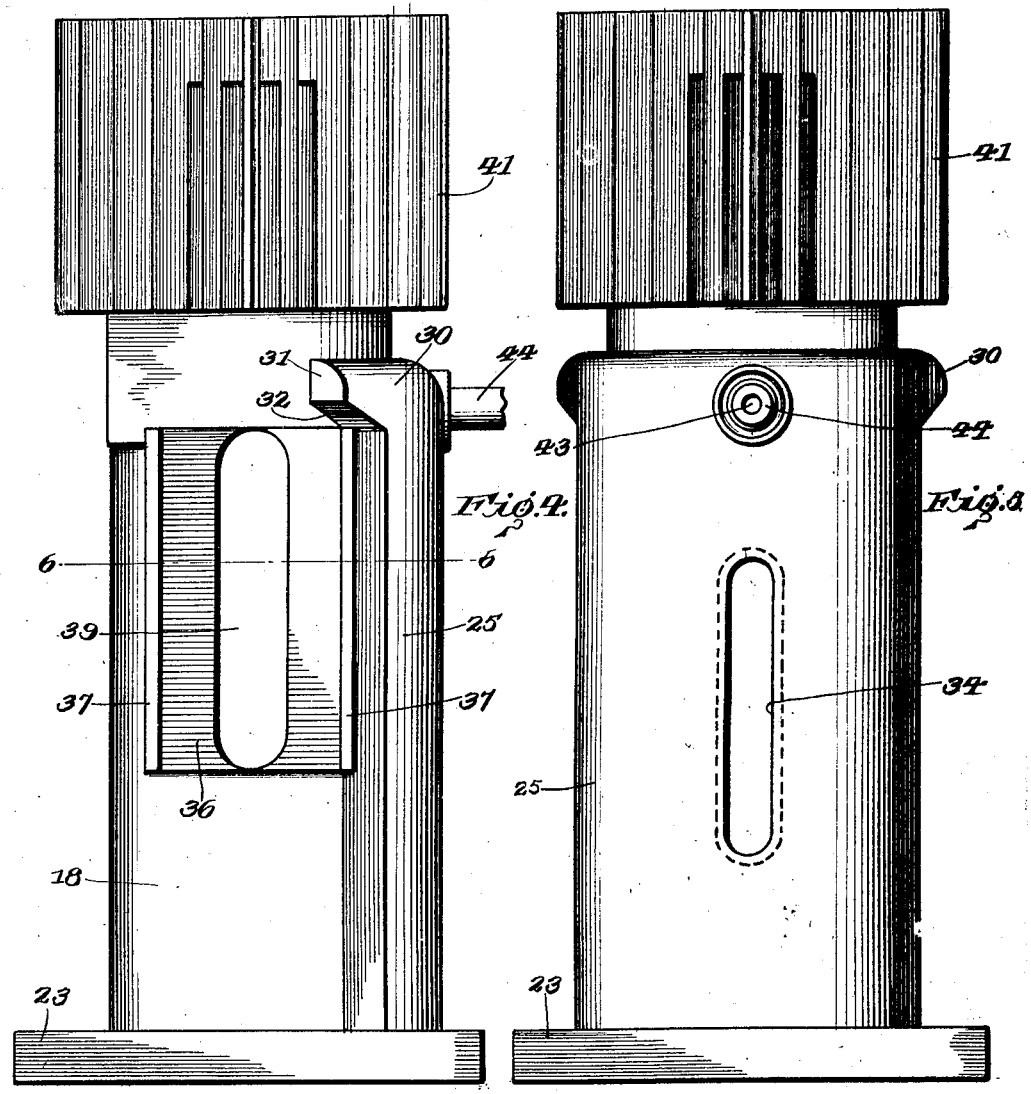
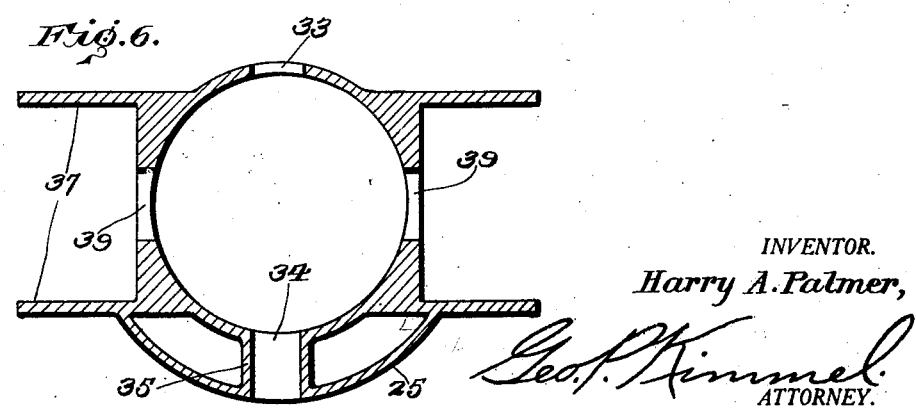
INVENTOR.
*Harry A. Palmer,*
Geo. F. Kimmel
ATTORNEY.

Patented May 7, 1929.

1,711,904

UNITED STATES PATENT OFFICE.

HARRY A. PALMER, OF DORCHESTER, MASSACHUSETTS, ASSIGNOR TO PALMER INVENTIONS, INC., OF BOSTON, MASSACHUSETTS, A CORPORATION OF MASSACHUSETTS.

CYLINDER FOR INTERNAL-COMBUSTION ENGINES.

Application filed April 11, 1927. Serial No. 182,805.

This invention relates to internal combustion motors, more particularly the cylinders thereof, and is designed primarily for use in connection with the form of internal combustion engine as disclosed in my application Serial No. 182,806, filed April 11, 1927, but it is to be understood that a cylinder for internal combustion motors, in accordance with this invention can be used in connection with any type of engine for which it is found applicable, and the invention has for its object to provide, in a manner as hereinafter set forth a cylinder having means co-relating with the piston operating therein to provide for cooling the latter by atmospheric air during its operation.

A further object of the invention is to provide, in a manner as hereinafter set forth, a cylinder for internal combustion motors providing a piston chamber and further provided with a valved controlled by-pass for conducting an incoming combustible charge from the inner end of the piston chamber to the combustion space for the latter forwardly of the piston on the power stroke of the latter.

A further object of the invention is to provide, in a manner as hereinafter set forth a cylinder for internal combustion motors constructed and arranged to provide for the travel of a wrist pin bodily carried by the piston transversely of and projecting from the latter.

A further object of the invention is to provide, in a manner as hereinafter set forth a cylinder for internal combustion motors constructed and arranged to provide for the complete scavenging therefrom of the exhaust gases.

A further object of the invention is to provide, in a manner as hereinafter set forth a cylinder for internal combustion motors constructed and arranged to provide an enclosing means for guide members for a travelling wrist pin bodily carried by the piston of the motor.

Further objects of the invention are to provide, in a manner as hereinafter set forth a cylinder for internal combustion motors which is simple in its construction and arrangement, strong, durable, compact, thoroughly efficient in its use, readily set up and comparatively inexpensive to manufacture.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a vertical sectional view of an internal combustion motor showing the adaptation therewith of a cylinder in accordance with this invention.

Figure 2 is a vertical sectional view, upon an enlarged scale of the cylinder.

Figure 3 is a section on line 3—3 Figure 2.

Figure 4 is an elevation of a cylinder for internal combustion motors in accordance with this invention.

Figure 5 is a view similar to Figure 4 but taken at right angles thereto.

Figure 6 is a section on line 6—6 of Figure 4.

Referring to the drawings in detail 1 denotes a power transmitting shaft, 2 a platform, 3 bearings for the shaft 1, 4 lubricant reservoirs for the bearings and shaft, 5 a support for the platform, 6, 7 a pair of impellers for operating the shaft 1, which are fixedly secured to the latter, as indicated at 8, and provide means when operated for rotating the shaft 1. An operating means for the impellers 6, 7 is indicated at 9 and which include a wrist pin 10. The foregoing elements form parts of an internal combustion engine of a construction similar to that disclosed in my application as aforesaid. The wrist pin 10 is carried by and operated by the piston 11, which is hollow and closed at its ends by the heads 12, 13 and said piston 11 forms a cooling air receiving chamber 14 and is provided at diametrically opposite points with lengthwise extending slots 15, to provide for circulation of atmospheric air through the chamber 14 and to cool the piston. The forward head 12 of the piston is provided with rearwardly extending spaced cooling fins 16. The form of piston referred to is as disclosed in my application aforesaid. As the subject matter of this application relates to the cylinder construction referred to generally by the reference character 17, it is thought unnecessary to specifically describe any of the structural features illustrated, other than the cylinder construction.

The cylinder 17 comprises a body portion 18 having its inner or rear end open and its forward end closed, as indicated at 19 and provided with means, as at 20 for connecting a spark plug therewith. The body portion 18 forms a piston chamber 21 and the forward part of said chamber 21 provides a combustion space 22. The inner end of the body portion 18 is formed with a laterally extending continuous flange 23 through which extends holdfast devices 24' for fixedly securing the cylinder 17 to the platform 2 and the latter closes the inner end of the piston chamber 21. The inner end of the body portion 18, as well as the flange 23 is cut away to form a port 24 for a purpose to be presently referred to.

Formed integral with the flange 23 and also with the body portion 18 for a portion of its length is an offset web 25, which provides a by-pass 26 and the port 24 communicates with the inner end of said by-pass 26 and establishes communication between the inner end of the piston chamber 21 and said by-pass 26. Arranged within the by-pass 26 in proximity to its inner end is a spring controlled check valve 27 which normally closes the by-pass 26 to the piston chamber 21. The valve 27 is operated on the power stroke of the piston so that the combustible charge can be forced from the piston chamber 21 up through the by-pass and into the cylinder forwardly of the piston 17.

The body portion 18 is formed with a circumferentially extending narrow intake 28, which is bridged as at 28' and opposing the intake 28, as well as being of greater width than the width thereof, is an outlet port 29 for the exhaust gases and which is bridged at at 29'.

The upper end of the web 25 is extended laterally in opposite directions or flared as at 30 and said flared end is secured to the body portion 18 above the intake 28. Formed integral with the body portion 18 are extensions 31, 32 which are also integral with the upper end 30 of the web 25 and said extension and upper end 30 provide means for enclosing the intake 28. The flared upper end 30 of the web 25 is of greater length than the length of the intake.

The body portion 18 at diametrically opposite points is formed with lengthwise extending slots 33, 34 the latter registering with a tubular member 35 which is integral with the body portion 18 of the web 25. The slots 33, 34 are adapted to register with the slots 15 in the piston whereby during the operation of the latter means is set up to provide for the intake and exhaust of atmospheric air for the purpose of cooling the piston. By this arrangement an air cooled piston is set up.

The slots 33, 34 are arranged below the intake 28 and exhaust port 29 and below the same. The body portion 18, at right angles to the exhaust port 29 is formed with a pair of peripheral enlargements 36 each formed with a pair of opposed arms 37 and each enlargement with its arms forms an enclosing means for a guide member 38. The guide members are channel shaped and form elements of the internal combustion engine as disclosed in my application aforesaid. The enlargements 36 are provided with slots 39 which register with slots 40 formed in the guide members and the registering slots form clearances for the travel of the wrist pin 10 during the reciprocation of the piston 11. That portion of the cylinder above the intake 28 is provided with cooling fins 41 which extend across the top of the cylinder.

Formed integral with the body portion 18 and extending into the by-pass 26 is a tapered annulus 42 which provides a seat for a controlling valve, not shown, for the intake 28. The web 25 is formed with an opening 43 disposed to align with the axis of the annulus 42 and said web 25 is furthermore provided with an outwardly projecting integral sleeve 44 which registers with the opening 43 and is adapted to receive the valve stem of the controlling valve for intake 28.

The discharge port or outlet is bridged and of greater length than the length of the intake 28, see Figure 3.

When the cylinder is set up in active position its inner or rear end is closed by the platform 2 and which provides a compression chamber for the charge sent through the by-pass to the intake port at side wall of cylinder.

What I claim is:

1. A cylinder for an internal combustion motor comprising a body portion formed with intake and exhaust openings, laterally extending, oppositely disposed guide receiving means positioned at right angles to and arranged below said openings, integral with the outer face of the body portion on opposite sides thereof and further extending lengthwise of the latter, said body portion formed with a lengthwise extending slot at the front, back and sides thereof and positioned inwardly with respect to said openings, the slots at said sides opening into said guide receiving means, an offset web integral with the outer periphery of the body portion and extending above and below said guide receiving means and further integral with one of the sides of each of said guide receiving means and providing a by-pass communicating at its upper portion with said intake opening and at its lower end communicating with the interior of said body portion, and means within the by-pass and integral with the web and body portion to provide a seat for a valve, said seat opposing said intake opening.

2. A cylinder for an internal combustion motor comprising a body portion formed with intake and exhaust openings, laterally extending, oppositely disposed guide receiving means positioned at right angles to and arranged below said openings, integral with the outer face of the body portion on opposite sides thereof and further extending lengthwise of the latter, said body portion formed with a lengthwise extending slot at the front, back and sides thereof and positioned inwardly with respect to said openings, the slots of said sides opening into said guide receiving means, an offset web integral with the outer periphery of the body portion and extending above and below said guide receiving means and further integral with one of the sides of each of said guide receiving means and providing a by-pass communicating at its upper portion with said intake opening and at its lower end communicating with the interior of said body portion, means within the by-pass and integral with the web and body portion to provide a seat for a valve, said seat opposing said intake opening, and means on the web and opposing said seat to provide a guide for a valve stem.

3. A cylinder for an internal combustion motor comprising a body portion formed with intake and exhaust openings, laterally extending, oppositely disposed guide receiving means positioned at right angles to and arranged below said openings, integral with the outer face of the body portion on opposite sides thereof and further extending lengthwise of the latter, said body portion formed with a lengthwise extending slot at the front, back and sides thereof and positioned inwardly with respect to said openings, the slots at said sides opening into said guide receiving means, an offset web integral with the outer periphery of the body portion and extending above and below said guide receiving means and further integral with one of the sides of each of said guide receiving means and providing a by-pass communicating at its upper portion with said intake opening and at its lower end communicating with the interior of said body portion, means within the by-pass and integral with the web and body portion to provide a seat for a valve, said seat opposing said intake opening, and means integral with said body portion and web to provide a continuation of one of said slots.

4. A cylinder for an internal combustion motor comprising a body portion formed with intake and exhaust openings, laterally extending, oppositely disposed guide receiving means positioned at right angles to and arranged below said openings, integral with the outer face of the body portion on opposite sides thereof and further extending lengthwise of the latter, said body portion formed with a lengthwise extending slot at the front, back and sides thereof and positioned inwardly with respect to said openings, the slots at said sides opening into said guide receiving means, an offset web integral with the outer periphery of the body portion and extending above and below said guide receiving means and further integral with one of the sides of each of said guide receiving means and providing a by-pass communicating at its upper portion with said intake opening and at its lower end communicating with the interior of said body portion, means within the by-pass and integral with the web and body portion to provide a seat for a valve, said seat opposing said intake opening, means on the web and opposing said seat to provide a guide for a valve stem, and means integral with said body portion and web to provide a continuation of one of said slots.

In testimony whereof, I affix my signature hereto.

HARRY A. PALMER.